June 3, 1930. R. J. EMMERT 1,761,523
CONVEYER FOR DYNAMO ARMATURES
Original Filed Oct. 29, 1925

Inventor
Rodger J. Emmert
By Spencer Hardman and Fehr
his Attorney

Patented June 3, 1930

1,761,523

UNITED STATES PATENT OFFICE

RODGER J. EMMERT, OF DAYTON, OHIO, ASSIGNOR TO DELCO-REMY CORPORATION, OF DAYTON, OHIO, A CORPORATION OF DELAWARE

CONVEYER FOR DYNAMO ARMATURES

Original application filed October 29, 1925, Serial No. 65,687. Divided and this application filed January 5, 1928. Serial No. 244,719.

This invention relates to conveying apparatus and particularly to apparatus for conveying the armatures of dynamo electric machines through a tray or vat containing insulating varnish in order to coat the armature windings, and for conveying the coated armatures through an oven in which the insulating coating is dried.

This application is a division of application, Serial No. 65,687, filed October 29, 1925.

One object of the present invention is to provide a conveyer having means for supporting the armature assembly by the end portions of the armature shaft, and also to minimize the possibility of the armatures becoming disengaged from the conveyer as they are passed through the varnish trays and oven.

Further objects and advantages of the present invention will be apparent from the following description, reference being had to the accompanying drawings, wherein a preferred form of embodiment of the present invention is clearly shown.

Figure 2:
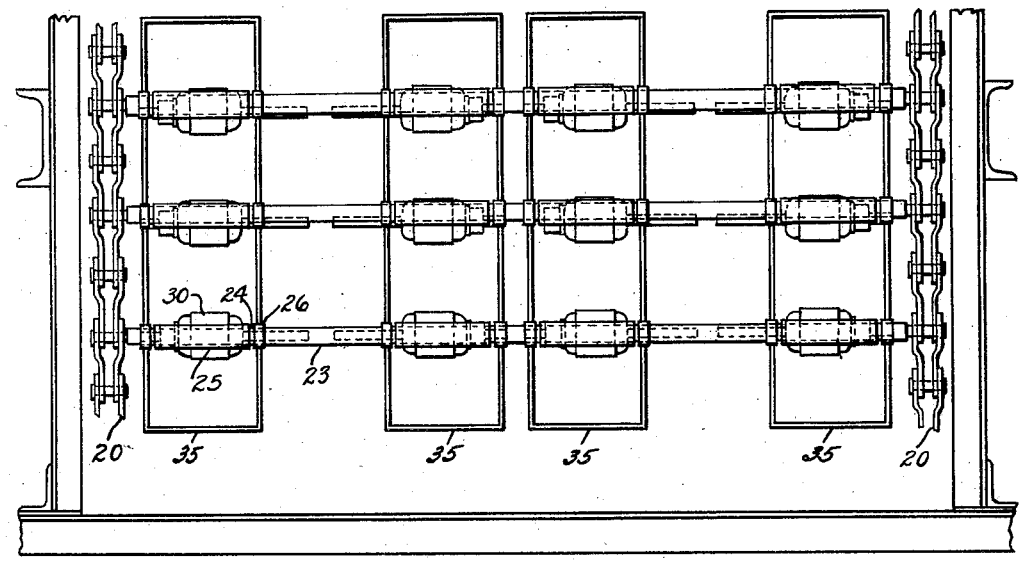
Figs. 2 and 3 are plan and sectional views, respectively, on a larger scale, of a portion of the conveyer and the armature varnish trays.
Figure 3:
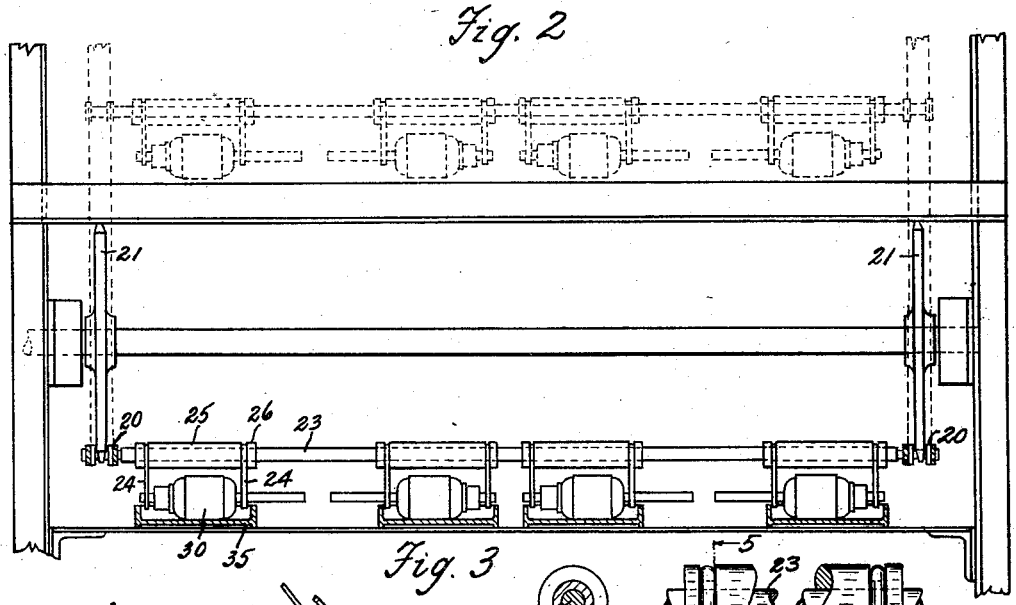

The conveying apparatus comprises parallel chains 20 which are passed around suitably spaced pulleys or sprocket wheels 21 mounted on shafts 22, one of the shafts being driven in any suitable manner not shown. The conveyer chains support a plurality of rods 23 which support a plurality of pairs of hooks 24. Each pair of hooks 24 is connected by a sleeve 25 which is rotatable on the supporting rod 23 and is confined between spaced collars 26 attached to the rod. Each pair of hooks 24 supports the end portions of the shaft of an armature 30.

Figures 1, 4, 5:
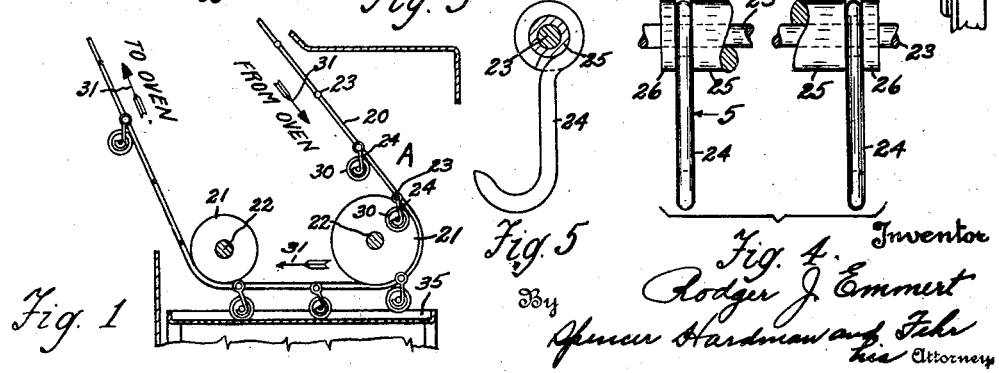
Fig. 1 is a diagrammatic, longitudinal sectional view showing a portion of the conveyer and one of the varnish trays through which armatures are conveyed.
Fig. 4 is an elevation of a pair of hooks included in the conveyer and adapted to support an armature by its shaft.
Fig. 5 is a sectional view on the line 5—5 of Fig. 4.

The conveyer chains 20 are moved in the direction of the arrows 31 in Fig. 1. The uncoated armatures 30 are placed upon its hooks 24 as they move into loading position designated by the letter A in Fig. 1. The conveyer lowers the armatures into the path of insulating varnish contained in the trays 35 which are suitably supported below the conveyer shafts 22 as shown. The distance between the trays 35 and the shafts 22 is such that the armatures are permitted to roll upon the bottoms of the trays 35 as the conveyer moves the armatures from right to left as viewed in this figure.

As the armatures pass through the trays of insulating varnish, they are conveyed to a suitable drying oven and then to an unloading position which is not shown. From the unloading position, the empty hooks 24 are conveyed again to the loading position A.

Since the hooks 24 of each pair are connected together by a sleeve 25 which is rotatable upon a rod 23, the hooks must swing together. By reason of this construction, it is impossible for the shafts of the armatures to be located out of parallelism with the rods 23 due to any external force applied to the armature and tending to move one end of it faster than the other. This construction tends to prevent the accidental disengagement of the armature from the supporting hooks. By maintaining parallelism between armatures 30 and rods 23 as the armatures are moved through the varnishing trays 35, the armatures are caused to roll in a substantially straight line along the bottoms of the trays. Thus there is very little tendency for the armature to creep over against one of its supporting hooks and cease turning while it is being dragged through the tray of varnish. In this manner the conveyer insures that the armature will be permitted to rotate freely as it passes through the insulating varnish so that all of its conductors will be coated.

While the form of embodiment of the present invention as herein disclosed, constitutes a preferred form, it is to be understood that other forms might be adopted, all coming within the scope of the claims which follow.

What is claimed is as follows:

1. A conveyer for dynamo armatures comprising, in combination, a plurality of parallel chains driven at the same rate, parallel cross rods supported by the chains, and pairs of spaced hooks pivotally supported by the rods and adapted to engage the shaft of an armature, said hooks being connected to swing together.

2. A conveyer for dynamo armatures comprising, in combination, a plurality of parallel chains driven at the same rate, parallel cross rods supported by the chains, sleeves rotatable on said rods, and pairs of spaced hooks supported by the rods, each pair of hooks being connected by a sleeve so that the hooks swing together, and being adapted to engage the shaft of an armature.

In testimony whereof I hereto affix my signature.

RODGER J. EMMERT.